April 9, 1929.  J. H. CANNON  1,708,258
TOASTER
Filed April 21, 1926  2 Sheets-Sheet 1
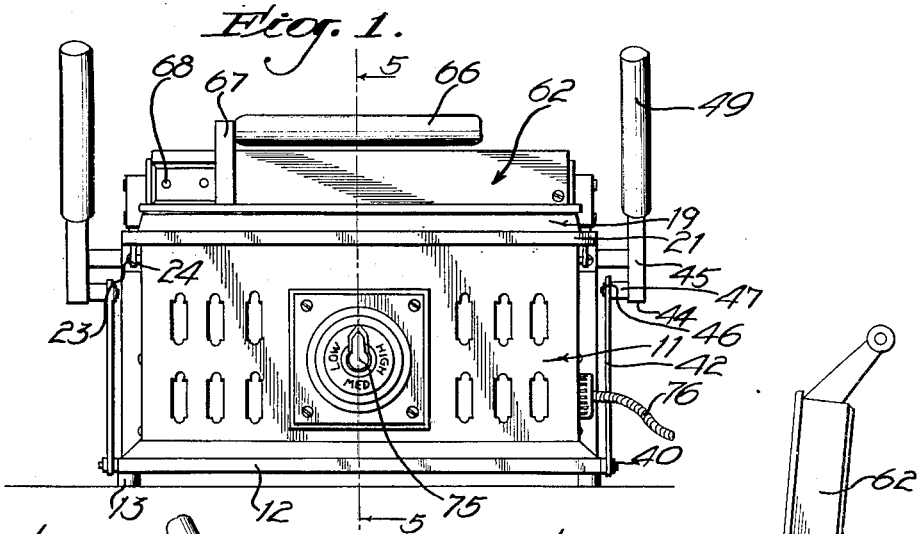
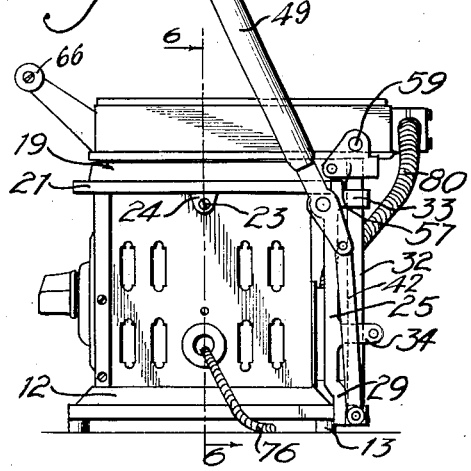
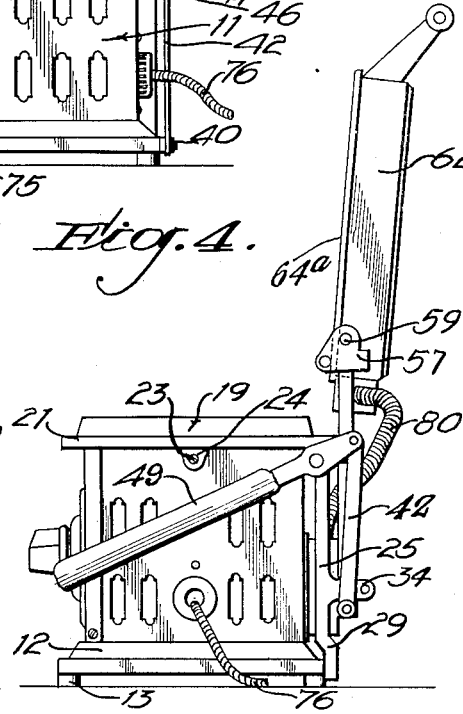
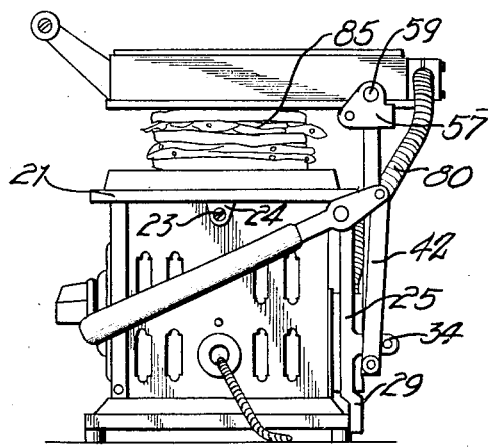
INVENTOR:
JAMES H. CANNON,
BY
ATTORNEY.

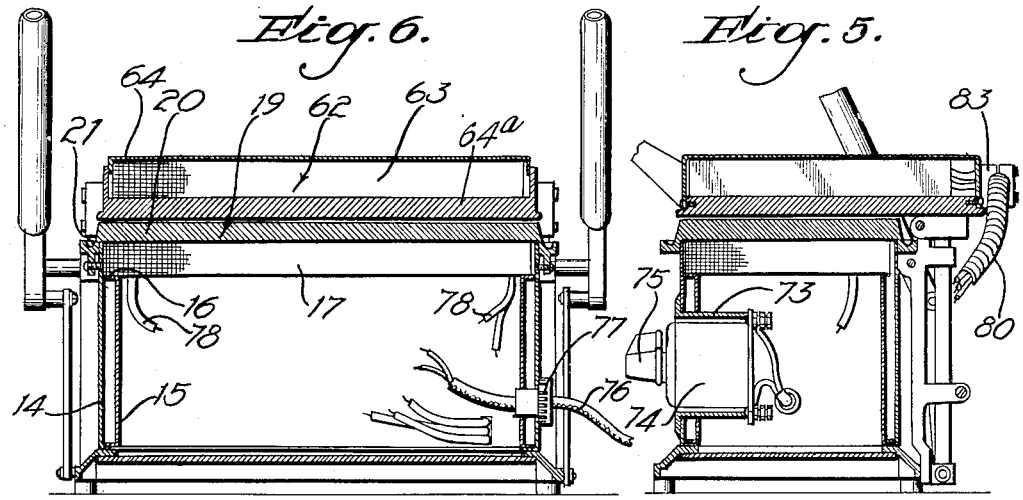
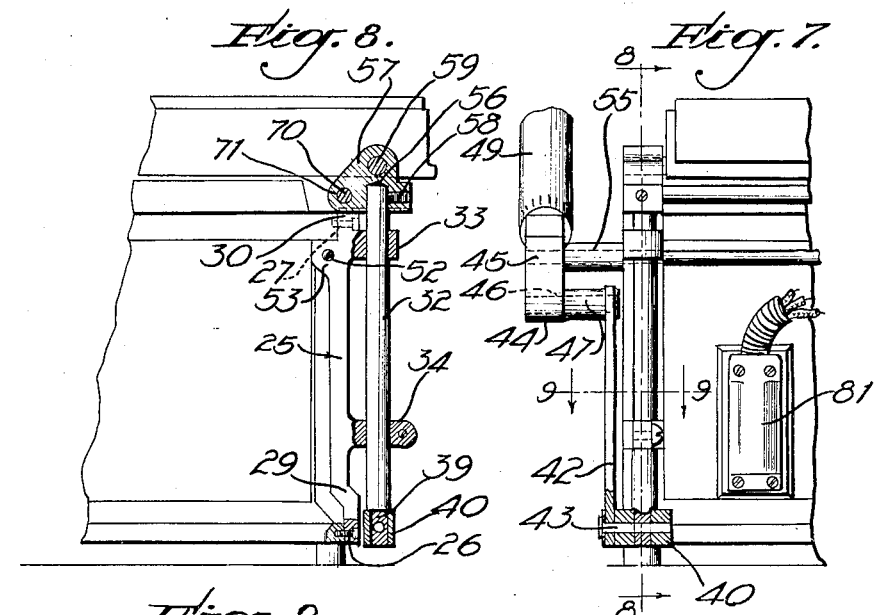
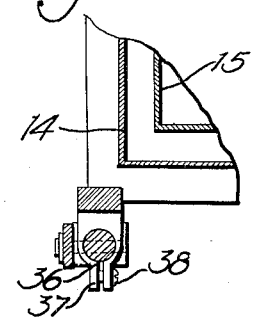

Patented Apr. 9, 1929.

1,708,258

UNITED STATES PATENT OFFICE.

JAMES H. CANNON, OF LOS ANGELES, CALIFORNIA, ASSIGNOR TO CANNON ELECTRIC DEVELOPMENT COMPANY, OF LOS ANGELES, CALIFORNIA, A CORPORATION OF CALIFORNIA.

TOASTER.

Application filed April 21, 1926. Serial No. 103,455.

This invention relates to toasters and particularly to a toaster especially adapted for toasting sandwiches.

Toasted sandwiches have become quite popular and are served at almost all eating houses. Toasted sandwiches are generally made in the following manner: The bread is first toasted and then the sandwich is made. This takes more time than is usually required to make the ordinary untoasted sandwich and the toasted bread cools while the sandwich is being made.

It is an object of this invention to provide a toaster in which a sandwich already made may have the bread thereof toasted.

It is another object of the invention to provide a toaster of this character which is adjustable for different thicknesses of sandwiches.

Another object of my invention is to provide a toaster of the character mentioned in which a sandwich may be easily placed in and removed from the toaster.

Further objects and advantages will be made manifest hereinafter.

Referring to the drawings in which I illustrate my invention,

Fig. 1 is a front elevation.

Fig. 2 is a side elevation taken as indicated by the arrow 2 of Fig. 1.

Fig. 3 is a view similar to Fig. 2 but showing a sandwich placed therein.

Fig. 4 is an elevational view similar to Fig. 3, this view showing the toaster in position ready to receive a sandwich to be toasted.

Fig. 5 is a section taken substantially on the line 5—5 of Fig. 1.

Fig. 6 is a section taken substantially on the line 6—6 of Fig. 2.

Fig. 7 is a fragmentary elevational view looking from the back of the toaster.

Fig. 8 is a section taken on the line 8—8 of Fig. 7.

Fig. 9 is a section taken on the line 9—9 of Fig. 7.

The form of the invention shown in the drawings has a body 11. This body 11 consists of a base 12 having pads 13, and an outer shell 14 which is secured to and supported by the base 12. Inside the outer shell 14 is an inner shell 15 which is also supported by the base 12 and which provides an upper ledge 16 on which there is supported a heating unit 17 of a stationary toasting element 19.

The stationary toasting element 19 also includes a stationary toasting plate 20 which covers the upper face of the heating element 17. Formed around the perimeter of the stationary plate 20 is a trough 21 which catches butter or other liquid which may drip from the toasting plate. The toasting plate 20 is secured in the position shown in the drawings by screws 23 which extend into the shell 14 and through lugs 24 which extend downwardly from the trough 21.

Guides in the form of frames 25 are attached to the rear corners of the body 11 by screws 26 and 27. The screws 26 extend through lower legs 29 of the frames 25 into the base 13 and the screws 27 extend through projections 30 formed at the upper ends of the frames 25 and into the stationary plate 20. Slides in the form of slide bars 32 are carried in upper bearings 33 and lower bearings 34 of the frames 25. The slide bars 32 extend in a vertical direction and are adapted to be moved vertically. The lower bearings 34 are formed as clearly shown in Fig. 9. These bearings are split, as indicated at 36, and have lugs 37 through which screws 38 extend for the purpose of clamping the two opposite lugs 37 together, thus constricting the bearings 34 on the slide bars 32. The purpose of this is to provide an adjustable friction so that the slide bars 32 may be frictionally held in a certain position with any desired amount of friction.

The lower ends of the slide bars 32 have reduced portions 39 which extend into pivot blocks 40. Links 42 are pivoted to the blocks 40 by means of pivot pins 43 which extend through the pivot blocks 40 and serve to secure them on the reduced portions 39 of the slide bars 32. The upper ends of the links 42 are connected to ends 44 of levers 45 by means of pivot pins 46. Spacers 47 are placed between the levers 45 and the upper ends of the links 42 in order to provide clearance between the body of the toaster and the levers which are provided with handles 49 by which they may be operated. The levers 45 are pivoted on pins 52 which extend outwardly from bosses 53 provided near the upper ends of the frames 25. Spacers 55 surround the pins 52 between the frames 25 and the levers 45.

The upper ends of the slide bars 32 are secured in cavities 56 of heads 57 by set screws 58. The heads 57 are connected together by a pivot shaft 59 which extends across the rear part of the toaster. This pivot shaft 59 connects the slide bars 32 together so that they move in unison and one cannot move relative to the other. A movable toasting element 62 is pivoted on the pivot shaft 59. The movable toasting element 62 has a heating unit 63, the upper part of which is enclosed by a cover 64. The sides and lower face of the heating unit 63 is enclosed by a movable toasting plate 64$^a$. The pivot shaft 59 extends through the movable toasting element, as illustrated in the drawings, and is journaled in the movable toasting plate 64. The movable toasting element is provided with a handle 66 which is secured to the front part thereof by means of a bracket 67, which bracket is secured thereto by rivets or screws indicated at 68. Extending across the toaster adjacent to and slightly below the pivot shaft 59 is a stop bar 70, the ends of which extend into openings 71 of the heads 57.

Secured to the front wall of the shell 14 is a cup-shaped member 73 which encloses a control switch 74 having an operating knob 75 by means of which the temperature of the toasting plates 20 and 64 may be regulated. A current supply wire 76 extends to the interior of the body 11 through an inlet bushing 77. This current supply wire 76 is connected to terminals of the control switch 74, as illustrated in Fig. 5. Extending from the control switch 74 to the stationary heating element 17 are wires 78, and extending to the movable heating unit 63 are wires 79. The heating units 17 and 63 each comprises a number of sections which may be separately energized. The switch 74 which does not comprise a part of this invention is so constructed that one or more of the sections in the heating units may be energized, as desired, by merely operating the knob 75. The wires 79 as shown best in Figs. 2 and 7 extend through a flexible casing 80, one end of which is connected to an outlet box 81 secured to the body 11 and the other end of which is secured to a box 83 which is connected to the rear part of the movable toasting element 62.

The operation of the invention is as follows:

When either of the handles 49 is swung from the position shown in Fig. 2 into the position shown in Fig. 3, the movable toasting element 62 is raised from the position shown in Fig. 2 into the position shown in Fig. 3. This movement of the movable toasting element is accomplished by an upward movement of either of the links 42, which lifts either of the slide rods 32 upwardly. Since the slide rods 32 are connected together the entire assembly associated therewith is moved upwardly therewith. As will be explained shortly, it is desired to adjust the movable toasting element in a certain position. For this reason I provide the clamping arrangements on the lower bearings 34 through which the slide bars 32 extend. Sufficient friction may be placed on the slide bars 32 in order that they will be frictionally held in the position into which they are moved. The movable toasting element, since it is pivoted on the pivot bars 59, may be moved from the position shown in Fig. 2 into the position shown in Fig. 4. When in the position shown in Fig. 4, the rear part of the toasting plate 64$^a$ engages the stop bar 70. The movable toasting element 62 swings slightly in back of vertical position so that the center of gravity thereof retains it in raised position. The stop bar 70 will prevent the movable toasting element from swinging downwardly much below a horizontal position.

In using the toaster, the knob 75 of the control switch 74 is operated in order to supply electricity to the heating units 17 and 63. When the toasting plates 20 and 64$^a$ have arrived at the proper temperature a sandwich, as indicated at 85 (Fig. 3), may be placed on the stationary toasting plate 20, the movable toasting element 62 being in raised position as shown in Fig. 4. The movable toasting element is then swung into horizontal position, as illustrated in Fig. 3. The vertical position of the movable toasting element 62 when it is in horizontal position is adjusted by moving either of the handles 49 so that a slight pressure is placed on the sandwich 85. In Fig. 3 the sandwich shown is what is commonly known as a "three-decker" and is of a certain thickness. If the toaster is to be used only for a certain thickness of sandwich, the lower bearings 34 may be clamped so that the slide rods 32 cannot be moved; however, if different thicknesses of sandwiches are to be toasted, the bearings 34 are adjusted so that the slide rods 32 are frictionally retained in a certain position which may be easily adjusted by operating either of the handles 49.

I have found that a very delicious sandwich is made if only the outer faces of the outer layers of bread are toasted; however, if desired, the bread used in the sandwich may be first toasted on just one side, which side is placed adjacent to the filling of the sandwich. When the sandwiches are placed in the toaster of my invention, the outer faces of the bread are toasted. The heat of the toasting plates 20 and 64 will penetrate the entire sandwich. The sandwich may be served immediately upon its removal from the toaster and will therefore be very warm as is desirable. When my invention is used, a number of sandwiches may be placed in my toaster. It will be seen that considerable time will be saved during the rush periods since it is not necessary to first toast the bread and then make the sandwich. Since eating houses have rush periods, this is a desirable feature.

I claim as my invention:

1. A toaster comprising: a body; a stationary toasting element supported by said body; guides supported by said body; slides supported by said guides so as to be slidable in a plane at right angles to the plane of said stationary toasting element; a pivoted lever pivotally supported by said body; a link connected to said pivoted lever and one of said slides; a movable toasting element supported by said slides; and adjustable means for causing said guides to frictionally engage said slides.

2. A toaster comprising: a body; a stationary toasting element supported by said body; guides supported by said body; slides supported by said guides so as to be slidable in a plane at right angles to the plane of said stationary toasting element; a pivoted lever pivotally supported by said body; a link connected to said pivoted lever and one of said slides; a movable toasting element; pivot means for pivotally attaching said movable toasting element to said slides; and adjustable means for causing said guides to frictionally engage said slides.

3. A toaster comprising: a body; a stationary toasting element supported by said body; guides supported by said body; slides supported by said guides so as to be slidable in a plane at right angles to the plane of said stationary toasting element; a pivoted lever pivotally supported by said body; a link connected to said pivoted lever and one of said slides; a movable toasting element; pivot means for pivotally attaching said movable toasting element to said slides; stop means for limiting the pivoting radius of said movable toasting element; and adjustable means for causing said guides to frictionally engage said slides.

4. A toaster comprising: a body; a stationary toasting element supported by said body; guide frames on either side of said body; slide bars vertically movable in said guide frames; a movable toasting element pivoted relative to said slide bars; pins extending from the sides of said body near the rear thereof; handles pivoted to said pins; and links connecting said handles and said slide bars, said links moving said slide bars when said handles are lowered and raised.

5. A toaster comprising: a body; a stationary toasting element supported by said body; guide frames on either side of said body; slide bars vertically movable in said guide frames; a pivot shaft extending between said slide bars to vertically align these bars; a movable toasting element journalled on said pivot bar; pins extending from the sides of said body near the rear thereof; handles pivoted to said pins; and links connecting said handles and said slide bars, said links moving said slide bars when said handles are lowered and raised.

6. A toaster comprising: a body; a stationary toasting element supported by said body; guide frames on either side of said body; slide bars vertically movable in said guide frames; head members on the upper ends of said slide bars; a pivot shaft extending between said head members to vertically align said slide bars; a movable toasting element journalled on said pivot bar; pins extending from the sides of said body near the rear thereof; handles pivoted to said pins and links connecting said handles and said slide bars, said links moving said slide bars when said handles are lowered and raised.

7. A toaster comprising: a body; a stationary toasting element supported by said body; guide frames on either side of said body; slide bars vertically movable in said guide frames; head members on the upper ends of said slide bars; a pivot shaft extending between said head members to vertically align said slide bars; a movable toasting element journalled on said pivot bar; a stop bar extending between said head members in a position to prevent said movable toasting element from lowering substantially past a horizontal position, said stop bar holding said movable toasting element in an upright position when said movable toasting element is pivoted upward about said pivot bar; pins extending from the sides of said body near the rear thereof; handles pivoted to said pins; and links connecting said handles and said slide bars, said links moving said slide bars when said handles are lowered and raised.

In testimony whereof, I have hereunto set my hand at Los Angeles, California, this 15th day of April, 1926.

JAMES H. CANNON.